United States Patent [19]
Loxton et al.

[11] Patent Number: 5,609,396
[45] Date of Patent: Mar. 11, 1997

[54] APPARATUS FOR RESTRAINING A VEHICLE OCCUPANT

[75] Inventors: Steven R. Loxton, Lake Port; Donald P. Czarnecki, Marysville, both of Mich.

[73] Assignee: TRW Vehicle Safety Systems Inc., Lyndhurst, Ohio

[21] Appl. No.: 507,110

[22] Filed: Jul. 26, 1995

[51] Int. Cl.⁶ .......... A62B 35/00; B60R 21/00; B60R 22/12; B60R 22/34
[52] U.S. Cl. .......... 297/473; 297/464; 297/468; 297/469; 297/483; 403/76
[58] Field of Search ............. 299/473, 464, 299/468, 469, 483; 403/76

[56] References Cited

U.S. PATENT DOCUMENTS

| | | | |
|---|---|---|---|
| 2,616,139 | 11/1952 | Von Wald, Jr. et al. | 403/76 |
| 3,691,788 | 9/1972 | Mazzioti | 403/76 X |
| 4,005,904 | 2/1977 | Weman et al. | 297/483 |
| 4,431,330 | 2/1984 | Darnell | 463/76 X |
| 4,549,749 | 10/1985 | Thomas | 297/483 X |
| 4,549,769 | 10/1985 | Pilarski | 297/483 |
| 4,582,340 | 4/1986 | Föhl | 297/483 X |
| 4,616,878 | 10/1986 | Föhl | 297/468 X |
| 5,037,135 | 8/1991 | Kotikowsky et al. | 297/483 X |
| 5,364,170 | 11/1994 | West | 297/464 X |
| 5,366,243 | 11/1994 | Ray et al. | 297/483 X |

*Primary Examiner*—Peter M. Cuomo
*Assistant Examiner*—Rodney B. White
*Attorney, Agent, or Firm*—Tarolli, Sundheim, Covell, Tummino & Szabo

[57] ABSTRACT

A seat belt positioning assembly (30) for seat belt webbing (16) includes a structure (50) that has an opening (52) through which the webbing (16) extends. The assembly (30) also includes a movable closure member (60) that blocks the opening (52) and a support assembly (70) for the closure member (60). The closure member (60) has a slot (62) through which the seat belt webbing (16) extends. The support assembly (70) supports the closure member (60) for simultaneous pivotal adjustment about a center (74) as well as for rotational adjustment about a central axis (72).

26 Claims, 4 Drawing Sheets

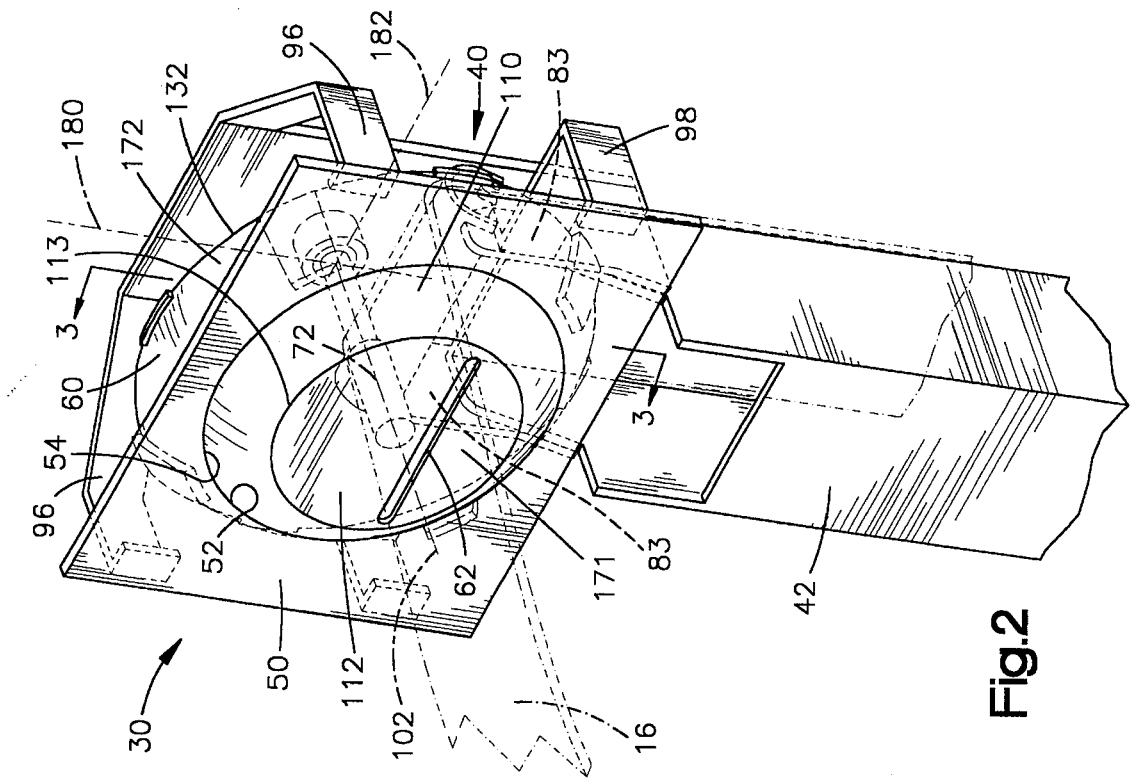
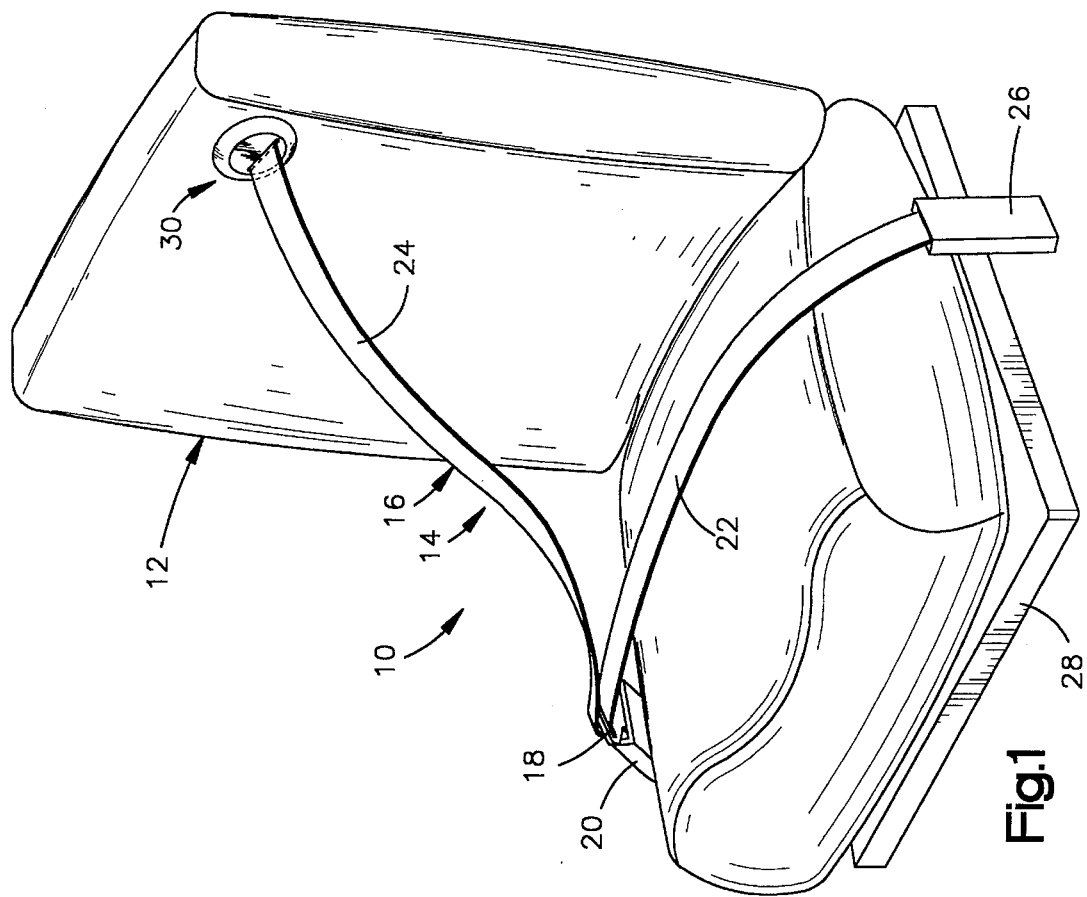
Fig.2
Fig.1

5,609,396

APPARATUS FOR RESTRAINING A VEHICLE OCCUPANT

FIELD OF THE INVENTION

The present invention relates to a seat belt system for restraining a vehicle occupant, and particularly relates to a seat belt system having a movable guide through which the seat belt webbing extends.

BACKGROUND OF THE INVENTION

A known seat belt system for restraining a vehicle occupant has seat belt webbing which extends over the occupant. For example, in a three point seat belt system, one end of the webbing is wound onto a spool in a seat belt retractor which is fixed to the vehicle. The other end of the webbing is connected to a webbing anchor which is also fixed to the vehicle. A tongue is slidable along the length of the webbing. The system further includes a buckle which is fixed to the vehicle.

When the tongue on the webbing is locked in the buckle, a lap belt portion of the webbing extends across the occupant's lap, and a shoulder belt portion of the webbing extends across the occupant's torso. It is desirable for the shoulder belt portion of the webbing to lie flat against the torsos of various sized occupants.

SUMMARY OF THE INVENTION

The present invention relates to a vehicle safety apparatus for restraining a vehicle occupant. The safety apparatus includes seat belt webbing extendable about the vehicle occupant and a structure having an opening through which the seat belt webbing extends. A movable closure member blocks the opening. The movable closure member has a slot through which the webbing extends. The closure member is rotatable about an axis extending through the opening. The closure member is also pivotable about a center spaced apart from the closure member.

In a preferred embodiment, the closure member has an outer side surface area which defines a portion of a sphere. A ball and socket joint is connected with the movable closure member to support the movable closure member for rotation about an axis and for pivotable movement about a center spaced apart from the movable closure member.

BRIEF DESCRIPTION OF THE DRAWINGS

The foregoing and other features of the present invention will become apparent to those skilled in the art to which the present invention relates upon consideration of the following description of the invention with reference to the accompanying drawings, wherein:

FIG. 1 is a perspective view of a vehicle safety apparatus embodying the present invention;

FIG. 2 is an enlarged perspective view of a portion of the apparatus of FIG. 1;

DESCRIPTION OF THE PREFERRED EMBODIMENT

General Description

Figure 5:
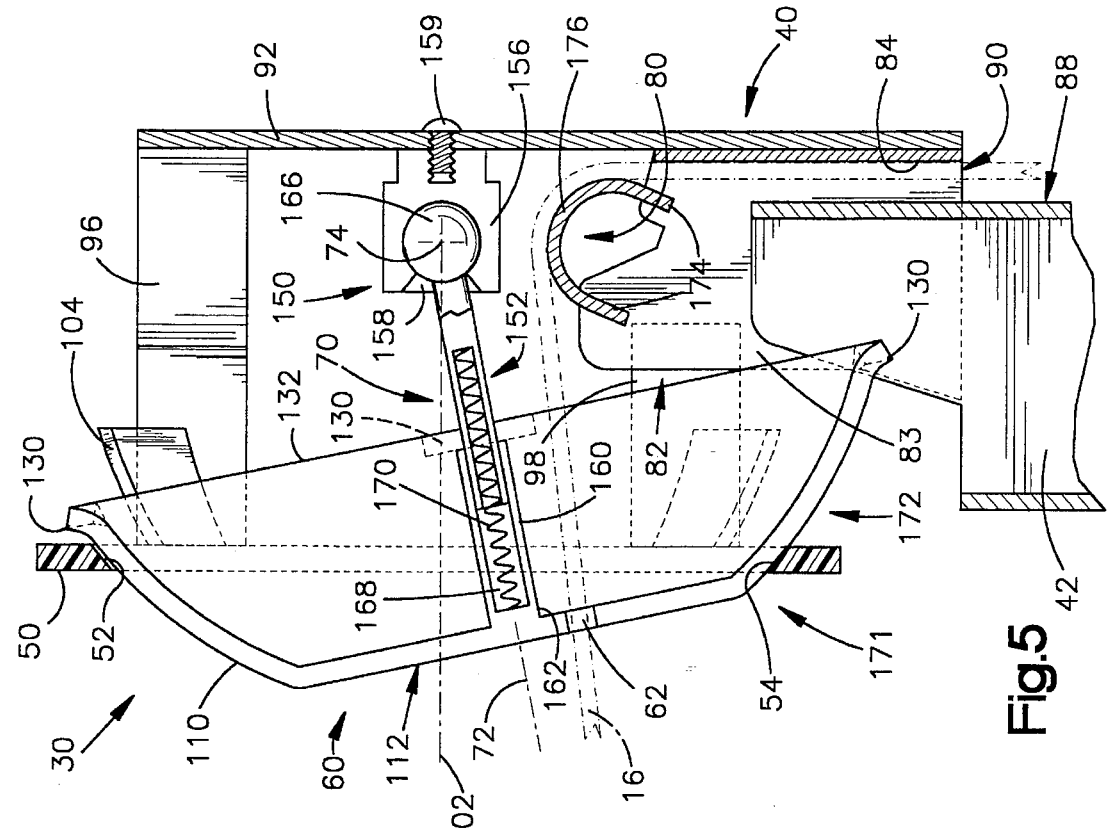
FIG. 5 is a view similar to FIG. 3 showing parts in a different position.

The present invention relates to a vehicle safety apparatus 10, (FIG. 1) which is used with a seat 12 for an occupant of a vehicle. The safety apparatus 10 includes a three point seat belt system 14. The seat belt system 14 includes a single continuous length of seat belt webbing 16 having a movable tongue 18. The tongue 18 is releasably lockable with a buckle 20 anchored to a seat base 28. The tongue 18 separates a lap portion 22 of the webbing 16 from a shoulder portion 24 of the webbing 16. The lap portion 22 of the webbing 16 extends across the lap of an occupant seated in the seat 12. The shoulder portion 24 of the webbing 16 extends across the torso of an occupant seated in the seat 12.

One end of the length of the seat belt webbing 16 is connected at an anchor point 26 to the seat base 28. The anchor point 26 is disposed adjacent a side of the seat 12 opposite the buckle 20. The opposite end of the length of seat belt webbing 16 extends from a seat belt retractor (not shown) through a seat belt positioning assembly 30 disposed in the upper portion of the seat 12. The seat belt retractor has a known construction and includes a spool upon which the webbing 16 is wound.

The seat belt positioning assembly 30 includes a base assembly 40 (FIG. 3) connected to a frame 42 of the vehicle seat 12. The positioning assembly 30 further includes a generally planar face plate 50 connected to the base assembly 40. The face plate 50 has a centrally disposed opening 52 defined by a smooth circular edge portion 54. The seat belt webbing 16 extends through the opening 52 in the face plate 50. A movable closure member 60 abuts the edge portion 54 and blocks the opening 52 in the face plate 50. The closure member 60 has a webbing slot 62 through which the seat belt webbing 16 extends.

The seat belt positioning assembly 30 further includes a support assembly 70 which supports the closure member 60 for rotation about a central axis 72 extending through the center of the closure member 60. The support assembly 70 further supports the closure member 60 for pivotal movement about a center 74 spaced rearward of the closure member 60.

The seat belt positioning assembly 30 further includes a seat belt webbing deflector 80 about which the webbing 16 extends. The seat belt webbing 16 extends upward from the retractor towards the webbing deflector 80. The webbing 16 is guided over the deflector 80 and then extends forward through the slot 62 in the closure member 60.

Base Assembly

The base assembly 40 has a rectangular mounting section 82 which comprises two side walls 83 connected by a back wall 84. The side walls 83 are connected to the frame 42 of the seat 12 such that the backwall 84 of the rectangular mounting section 82 is spaced from and parallel to the rear wall 88 of the frame 42 to form a webbing channel 90. The webbing 16 extends upward through the channel 90 from the retractor. An upright rectangular base plate 92 is connected to the back wall 84 of the rectangular mounting section 82. The base plate 92 is parallel to the frame 42 and the channel 90.

Face Plate

The face plate 50 is fixed to the base assembly 40 so that it is parallel to the base plate 92. The face plate 50 is connected to the base plate 92 by parallel upper support arms 96. The face plate 50 is further connected to the side walls 83 of the rectangular mounting section 82 by parallel lower support arms 98. The circular edge portion 54 of the face plate 50 defines the circular opening 52.

The opening 52 is centrally disposed in the face plate 50 and has a first diameter "a". The seat belt webbing 16 extends from the retractor through the opening 52. A central axis 102 extends through the opening 52 and is transverse to both the face plate 50 and the base plate 92. The central axis 102 also extends through and intersects the center 74 spaced rearward of the closure member 60.

The face plate 50 is illustrated in the drawings as having a rectangular shape. However, the face plate 50 could have various structural shapes, including but not limited to square, or circular.

Four equally spaced apart arcuate stop arms 104 extend rearward (illustrated to the right in FIG. 3) from the face plate 50 adjacent to the opening 52. However, it is contemplated that the face plate 50 could have more or less than four stop arms 104. It is also contemplated that the location of the stop arms 104 could vary.

Closure Member

The movable closure member 60 is received within and at least partially blocks the opening 52 in the face plate 50. The closure member 60 has a spherical outer side surface area 110 which defines a portion of a sphere. The outer side surface area 110 abuts the circular edge portion 54 defining the opening 52 in the face plate 50. The circular edge portion 54 guides the closure member 60 for rotational and pivotable movement relative to the face plate 50.

The spherical outer side surface area 110 circumscribes a flat circular face portion 112. The face portion 112 is defined by a circular edge portion 113. The face portion 112 has a second diameter "b" which is less than the first diameter "a".

The spherical outer side surface area 110 flares outward and away from the circular edge portion 113 of the flat circular face portion 112 to a circular peripheral edge portion 132. The circular peripheral edge portion 132 has a third diameter "c" which is greater than the second diameter "b".

Figure 3:
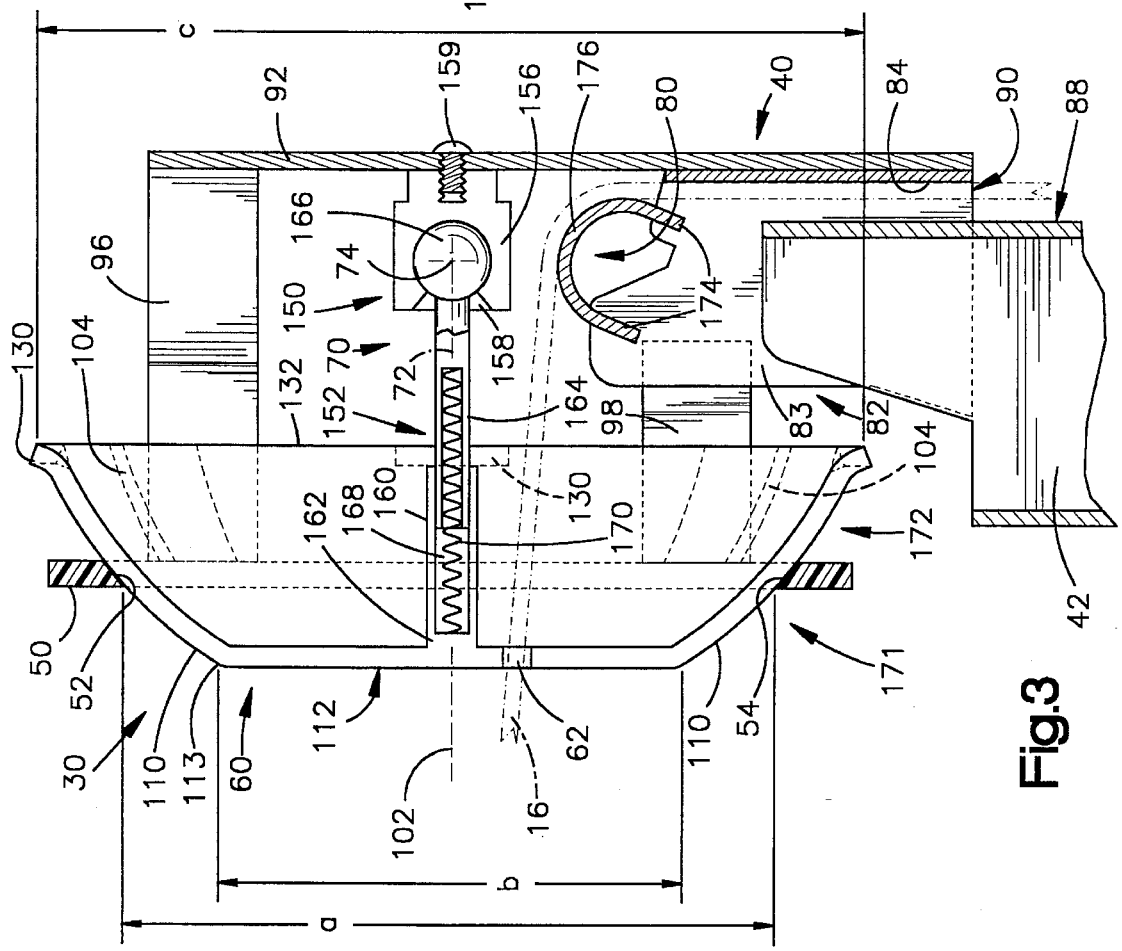
FIG. 3 is a view taken on line 3—3 of FIG. 2.

The face portion 112 has a central axis which is coincident with the central axis 72 about which the closure member 60 rotates (FIG. 5). In FIGS. 2 and 3, the closure member 60 is shown in its centered position. When the closure member 60 is in its centered position, the central axis 72 of the closure member 60 is coincident with the central axis 102 of the opening 52.

Figure 4:
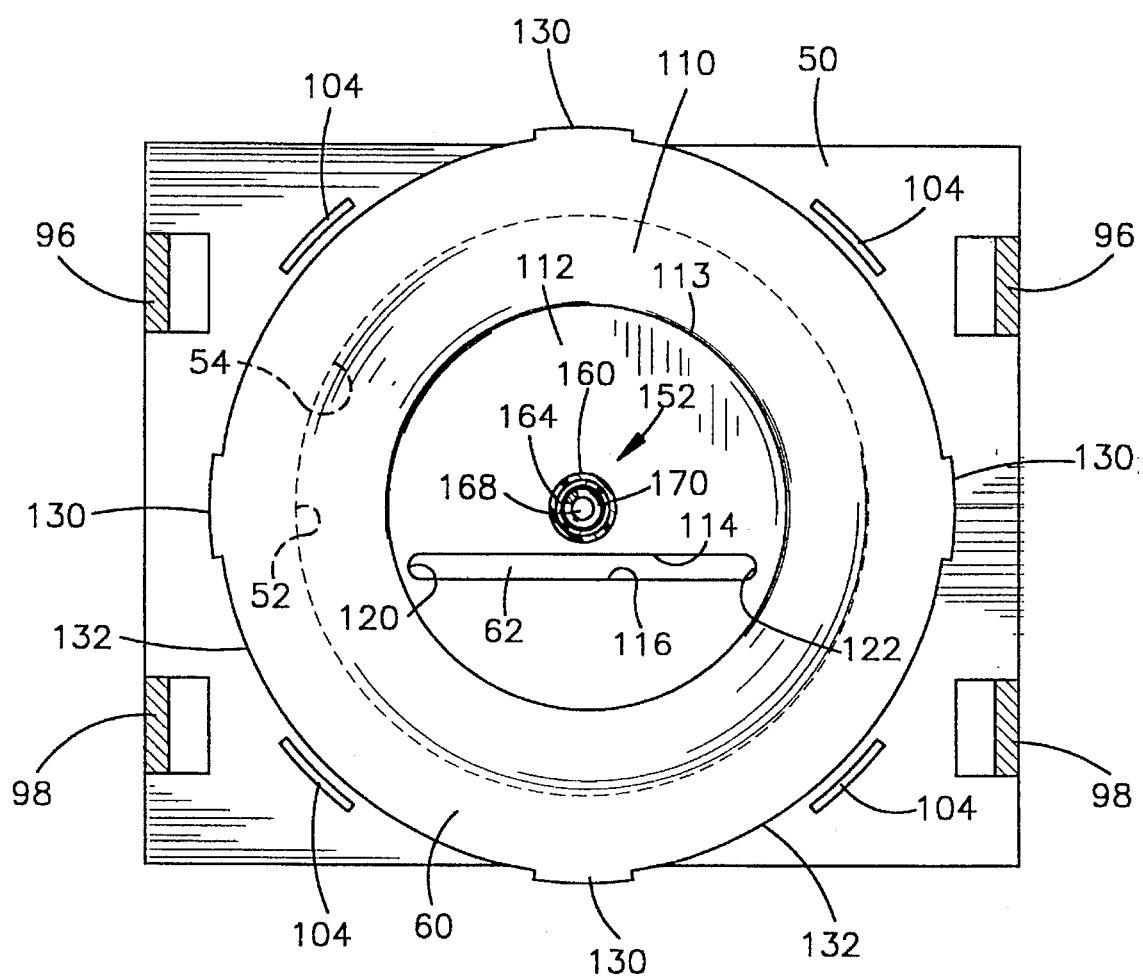
FIG. 4 is a rear elevational view of the apparatus of FIG. 2 with parts removed and parts in section.

The webbing slot 62 is disposed within the flat circular face portion 112 (FIG. 4). The slot 62 is offset from the central axis 72 of the closure member 60 and extends for substantially the entire diameter of the flat circular face portion 112. The slot 62 is defined by parallel upper and lower surfaces 114 and 116 which are connected by arcuate semi-circular right and left side surfaces 120 and 122. The webbing 16 engages surfaces 114, 116, 120, and 122 of the slot 62 to adjust the position of the closure member 60 relative to the central axis 72 and to the center 74 spaced rearwardly of the closure member.

There are four equally spaced apart stop sections 130 which limit the movement of the closure member 60. The stop sections 130 extend radially outward from the circular peripheral edge portion 132 of the closure member 60. The stop sections 130 are disposed at locations spaced between the stop arms 104. As with the stop arms 104, it is contemplated that the stop sections 130 could vary in number and location.

Support Assembly

The support assembly 70 supports the closure member 60 for rotational adjustment about the central axis 72 of the closure member 60 and for pivotal adjustment relative to the center 74 spaced rearward of the closure member.

The support assembly 70 comprises a ball and socket joint 150 which supports an elongated tubular support structure 152. The socket 156 of the ball and socket joint 150 has a centrally disposed cavity 158 and is connected by a screw 159 to the base plate 92 of the base assembly 40. The cavity 158 has a center coincident with the center 74.

The elongated tubular support structure 152 extends transverse to the base plate 92 and the face plate 50. The support structure 152 has a first tubular portion 160 which has a flat end 162. The flat end 162 of the first tubular portion 160 is connected to the center of the face portion 112 of the closure member 60. A second tubular portion 164 of the support structure 152 has a ball shaped end 166 which is received within the cavity 158 of the socket 156 so that the support structure is free to rotate about its central axis and to pivot about the center 74.

The first and second tubular portions 160 and 164 are disposed in a telescopic relationship with the second tubular portion inside the first tubular portion. Together, the tubular portions 160 and 164 define a passage 168 that extends between the flat end 162 of the first tubular portion 160 and the ball shaped end 166 of the second tubular portion 164. Disposed within the passage 168 is a biasing spring 170 which exerts opposing forces on the flat end 162 and the ball shaped end 166. The biasing spring 170 biases the outer side surface 110 of the closure member 60 against the circular opening 52.

Because of the differences between the diameters "a" and "c" of the opening 52 and the circular peripheral edge portion 132, respectively, an exposed portion 171 and a concealed portion 172 of the closure member 60 are defined when the closure member is received in the opening. The exposed portion 171 extends through the opening 52, while the concealed portion 172 remains behind the face plate 50. The exposed portion 171 comprises the face portion 112 and a portion of the spherical surface area 110. The concealed portion 172 comprises the circular peripheral edge portion 132, the stop sections 130, and the remaining portion of the spherical surface area 110.

Webbing Deflector

The linear webbing deflector 80 has spaced apart arms 174 and a curved surface 176 which connects the arms 174 to each other. The arms 174 are connected to the side walls 83 of the rectangular mounting section 82 so that the webbing deflector 80 is disposed directly under the socket 156 with a central axis of the webbing deflector extending transverse to the support member 152. The webbing deflector 80 has a width greater than the width of the seat belt webbing 16 and guides the seat belt webbing 16 from the retractor towards the slot 62 in the closure member 60.

Operation

In accordance with the present invention, the seat belt webbing positioning assembly 30 directs the withdrawn seat belt webbing 16 to lie flat against the torso of the occupant. This is accomplished by rotational and pivotal movement of the closure member 60. The closure member 60 is rotatable both clockwise and counterclockwise about its central axis 72. The closure member 60 is also pivotable about the center 74 spaced rearward of the closure member 60. Central axis 72 intersects both the center 74 spaced rearward of the closure member 60 and the point of intersection of orthogonal axes 180 and 182. Thus, as the closure member 60 pivots about the center 74, the closure member is movable any direction within any one of the quadrants created by the intersection of axes 180 and 182 (FIG. 2).

In the operation of the safety apparatus 10, the seat belt webbing 16 extends upward from the retractor through the channel 90 towards the webbing deflector 80. The seat belt webbing 16 is guided over the curved surface 176 of the webbing deflector 80 and extends forward to be directed through both the opening 52 in the face plate 50, and the slot 62 in the closure member 60.

The closure member 60 is supported for rotational and pivotal movement by the support assembly 70 and the face plate 50. The biasing spring 170 in the elongated tubular support structure 152 biases the closure member 60 against the circular edge portion 54 of the face plate 50. The outer side surface area 110 of the closure member 60 is arcuate and is disposed in engagement with the circular edge portion 54. Thus, because of the size of the outer side surface area 110, the closure member 60 essentially blocks the opening 52. The biasing spring 170 and the face plate 50 exert opposing forces on the closure member 60.

The seat belt webbing 16 can attain both a fully retracted position and a fully withdrawn position upon winding and unwinding of the seat belt webbing on the spool in the retractor. When the seat belt webbing 16 is in the fully retracted position, it is fully wound onto the spool, and a portion of the seat belt webbing 16 rests on the positioning assembly 30. When the seat belt webbing 16 is in its fully withdrawn position (FIG. 1), it is fully unwound from the spool and withdrawn from the retractor sufficiently to enable the tongue 18 to reach the buckle 20 at the other side of the seat 12.

When operating the vehicle safety apparatus 10, the occupant withdraws the seat belt webbing 16 and locks the tongue 18 into the buckle 20. This extends the seat belt webbing 16 across the seat 12 over the torso of the occupant. The tension in the seat belt webbing 16 acts on the surfaces 114, 116, 120, and 122 (FIG. 4) of the slot 62, thus rotating and pivoting the closure member 60 to direct the seat belt webbing to lie flat against the torso of the occupant. The tension in the seat belt webbing 16 causes the closure member 60 to pivot and rotate simultaneously. However, for the sake of clarity, the pivotal and rotational movement will initially be described as if they were occurring independently of each other.

With respect to the rotational movement, the closure member 60 is allowed to rotate about axis 72 due to the pivotal connection between the socket 156 and the ball shaped end 166 of the support structure 152. The direction of the rotational movement is dependent on the size of the vehicle occupant.

Figure 6:
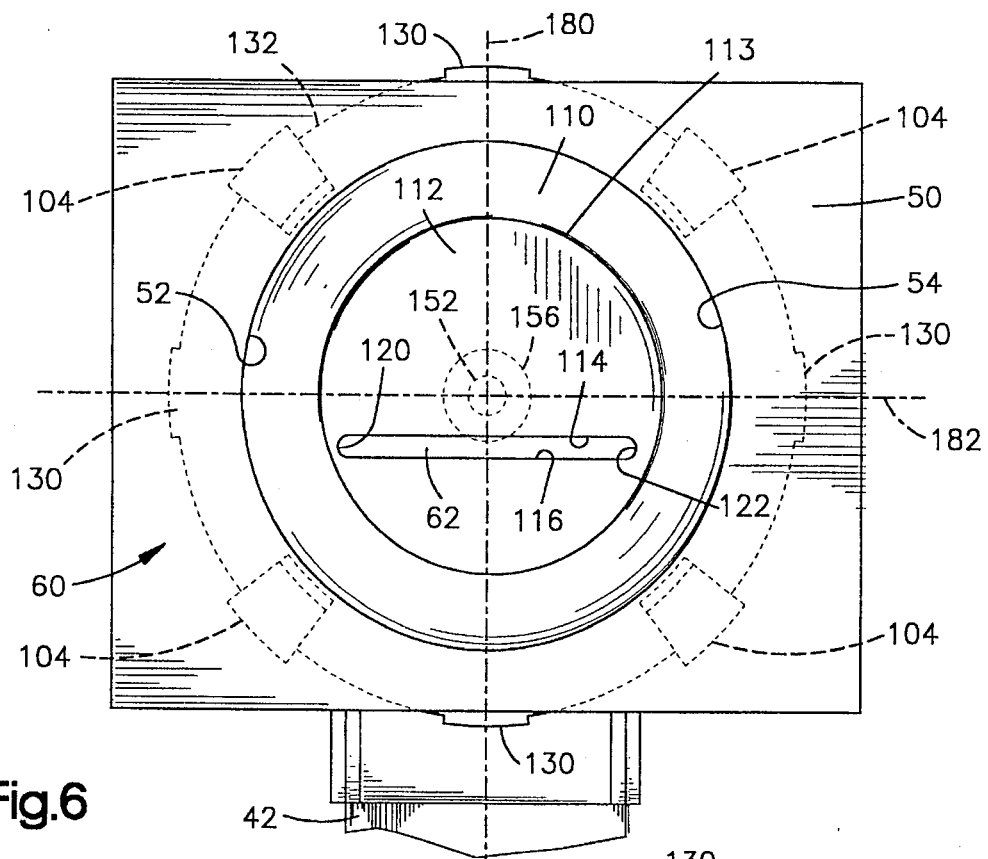
FIG. 6 is a front elevational view of the apparatus of FIG. 2.
Figure 7:
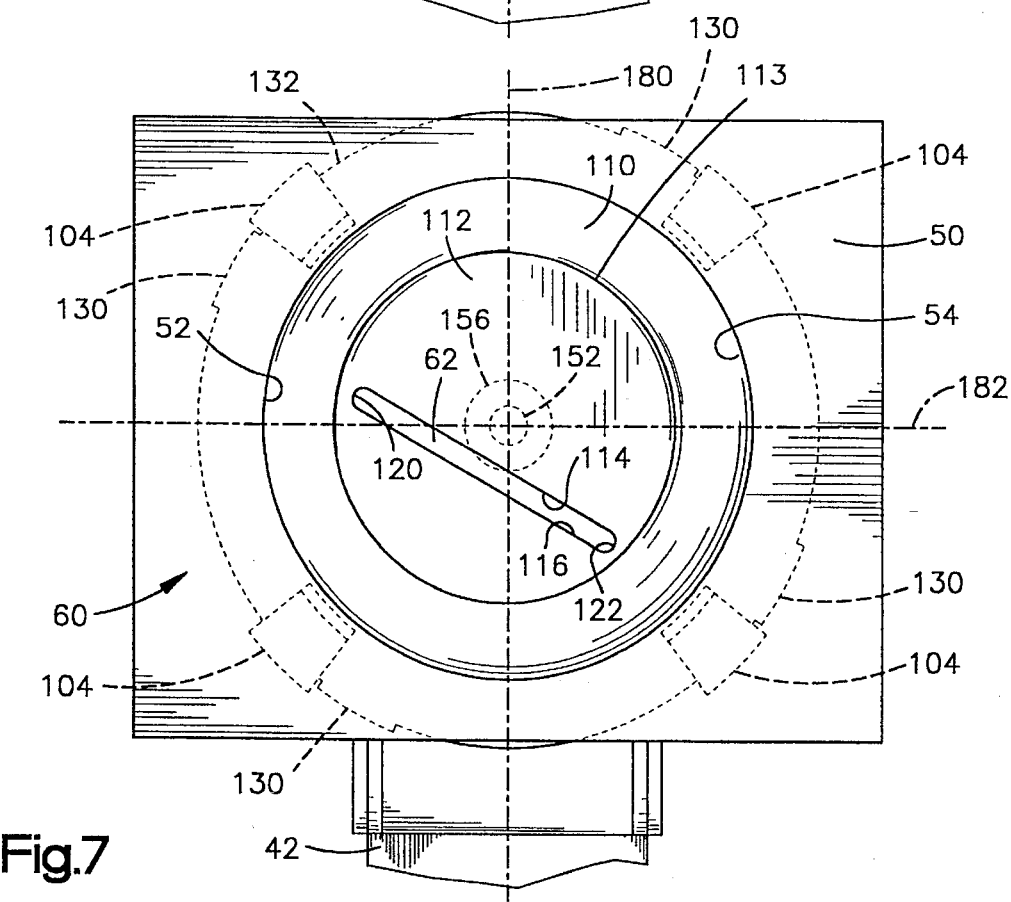
FIG. 7 is a view similar to FIG. 6 showing parts in a different position.

If the vehicle occupant operating the vehicle safety apparatus 10 is more narrow than a predetermined median size, the seat belt webbing 16 will engage the surfaces 114, 116 and 120 of the slot 62. The force from the tension in the seat belt webbing 16 is transferred to the surfaces 114, 116 and 120 partially defining the slot 62 of the closure member 60. The force acting on the surfaces 114, 116 and 120 is then transferred from the closure member 60 to the support structure 152. The forces transferred to the support structure 152 cause the ball shaped end 166 to rotate within the cavity 158 of the socket 156 and the closure member 60 to rotate clockwise about axis 72. Thus, the force from the tension in the seat belt webbing 16 rotates the closure member 60 from the rest position of FIGS. 3, 4 and 6 to the rotated position of FIG. 7. The slot 62 in the closure member 60 is then inclined so that the seat belt webbing 16 extends outward from the slot without being creased. The seat belt webbing 16 is thus directed to lie flat against the occupant's torso across the entire width of the seat belt webbing.

However, if the vehicle occupant operating the vehicle safety apparatus 10 is wider than a predetermined median size, the seat belt webbing 16 will engage the surfaces 114, 116, 122 of the slot 62. The tension in the seat belt webbing 16 will be transferred to the support structure 152 in the manner described above. The closure member 60 will rotate counterclockwise about axis 72 so that the seat belt webbing 16 will extend outward from the slot 62 without being creased.

In addition to rotational movement, the closure member 60 can pivot about the center 74 so that the closure member effectively moves along the orthogonal axes 180 and 182 (FIG. 2). As with the rotational movement, the tension in the seat belt webbing 16 is transferred to the surfaces 114, 116, 120 and 122 defining the slot 62. The force acting on the surfaces 114, 116, 120 and 122 is then transferred from the closure member 60 to the support structure 152. The force transferred to the support structure 152 causes the ball shaped end 166 to pivot within the cavity 158 of the socket 156. Thus, the closure member 60 is movable to accommodate occupants of varying sizes. As with the rotational movement, the direction of the pivotal movement is dependent on the size of the vehicle occupant.

For example, if the occupant is taller than a predetermined median size, the occupant's shoulder will be high enough to hold the seat belt webbing 16 in an elevated position. In the elevated position, the seat belt webbing 16 will engage the upper surface 114 defining the slot 62 and force the closure member 60 to pivot about the center 74 and move along the generally vertical axis 180, up to a raised position. Thereby, the support structure 152 will be upwardly angled with respect to the socket 156.

If the occupant is shorter than the predetermined median size, the seat belt webbing 16 will engage the lower surface 116 defining the slot 62. The force exerted by the webbing 16 on the surface 116 will cause the closure member 60 to pivot about the center 74 and move along the generally vertical axis 180, downward to a lowered position. Thereby, the support structure 152 will be downwardly angled from the socket 156 as can be seen in FIG. 5.

For accommodating vehicle occupants who are more narrow than the predetermined median size, the closure member 60 is pivotable about the center 74 to move along the generally horizontal axis 182. If the occupant is more narrow than the predetermined median size, the seat belt webbing 16 will engage the side surface 120 and cause the closure member 60 to pivot about the center 74. The closure member 60 will move to the left along the axis 182 to an inside position to direct the seat belt webbing 16 to extend from the slot 62 towards and against the more narrow vehicle occupant.

For accommodating vehicle occupants who are wider than the predetermined median size, the closure member 60 is pivotable about the center 74 to move outward, or to the right, along the generally horizontal axis 182. If the occupant is wider than the predetermined median size, the seat belt webbing 16 will engage the side surface 122 and cause the closure member 60 to move outward to an outside position to direct the seat belt webbing 16 to extend from the slot 62 towards and against a wider vehicle occupant.

The pivotal movement of the closure member 60 is not restricted to movement only along the orthogonal axes 180 and 182 (FIG. 2). The closure member 60 is freely pivotal in any direction within any of the four quadrants created by the intersection of the axes 180 and 182. Thus, the closure member 60 can pivot in any direction and at any angle from the intersection of the axes 180 and 182.

As described above, the ball-shaped end 166 of the support structure 152 can rotate about the central axis 72 and pivot about the center 74 so that the closure member 60 moves along either of the orthogonal axes 180 and 182 or along any axis within a quadrant created by the intersection of the orthogonal axes. Similarly, the support member 52 is allowed to rotate freely about the central axis 72 and to pivot universally in any direction about the center 74. As a result, the closure member 60 can align itself in an infinite number of variations so that the seat belt webbing 16 always extends outward from the slot 62 towards the tongue 18 without being creased, regardless of the size of the vehicle occupant.

As can be seen in FIGS. 3 and 4, the biasing force of the spring 170 maintains the outer side surface area 110 of the closure member 60 in abutment with the circular edge portion 54 of the face plate 50 even when the closure member 60 is undergoing pivotal and/or rotational adjustment.

The plurality of stop sections 130 and the plurality of stop arms 104 have been positioned such that they cooperate to limit the rotational and pivotal movement of the closure member 60. This is accomplished by one, or all, of the stop sections 130 on the closure member 60 abutting one, or all, of the stop arms 104 on the face plate 50 after the closure member has undergone a predetermined amount of adjustment. The rotational and pivotal movement is limited so that the slot 62 is free to move about the opening 52 of the face plate 50 without engaging the circular edge portion 54. However, the stop sections 130 and stop arms 104 are positioned such that they allow the slot 62 to align itself in virtually any orientation within the opening 52.

When the tongue 18 is released from the buckle 20, the rewind spring in the retractor rotates the spool to return the seat belt webbing 16 to its fully retracted position.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for restraining a vehicle occupant, said apparatus comprising:

seat belt webbing extendable about the vehicle occupant;

a structure having an opening through which said webbing extends;

a movable closure member which blocks the opening in said structure, said closure member having a slot through which said webbing extends; and means supporting said closure member for rotation about an axis extending through said opening and for pivotal movement about a center spaced from said closure member.

2. An apparatus as set forth in claim 1 wherein said means for supporting comprises a ball and socket joint connected with said closure member to support said closure member for rotation about the axis extending through said opening and for pivotal movement about the center which is spaced from said closure member.

3. An apparatus as set forth in claim 2 wherein said structure includes arcuate surface means for deflecting said webbing, said ball and socket joint being disposed above and adjacent to said arcuate surface means.

4. An apparatus as set forth in claim 3 further including a longitudinally extending member interconnecting said ball and socket joint and said closure member, said longitudinally extending member having a central axis which extends transverse to said arcuate surface means.

5. An apparatus as set forth in claim 1 wherein said structure includes an edge portion which defines said opening, said closure member having a first outer side surface area which defines a portion of a sphere, said first outer side surface area of said closure member being disposed in engagement with said edge portion of said structure and being movable relative to said edge portion of said structure.

6. An apparatus as set forth in claim 5 wherein said closure member includes a circular edge portion defining a second outer side surface area, said second outer side surface area is flat, said first outer side surface area flares outward and away from said circular edge portion of said second outer side surface area, said slot being at least partially defined by said second outer side surface area.

7. An apparatus as set forth in claim 5 further including spring means for pressing said first outer side surface area of said closure member against said edge portion of said structure.

8. An apparatus as set forth in claim 1 wherein said structure includes an edge portion which defines said opening, said apparatus further including spring means for pressing said closure member against said edge portion.

9. An apparatus as set forth in claim 1 wherein said means for supporting comprises a first tubular section connected with said closure member and a second tubular section connected with said structure, said first and second tubular sections being disposed in a telescopic relationship and enclosing a spring which presses said closure member against said structure.

10. An apparatus for restraining a vehicle occupant, said apparatus comprising:

seat belt webbing extendable about the vehicle occupant;

a structure having an opening through which said webbing extends, said opening having a longitudinal central axis;

a movable closure member having a slot through which said webbing extends, said closure member having a flat circular face portion and an outer side surface area which extends from said flat circular face portion axially along said central axis, said outer side surface area increasing in radial distance from said central axis of said opening as said outer side surface area extends axially along said central axis to define a portion of a sphere encircling said flat circular face portion and said central axis;

means supporting said closure member for blocking the opening in said structure.

11. An apparatus as set forth in claim 10, wherein said closure member is rotatable about an axis extending through said opening.

12. An apparatus as set forth in claim 10 wherein said means for supporting comprises a ball and socket joint connected with said closure member to support said closure member for rotation about an axis extending through said opening and for pivotal movement about a center spaced from said closure member.

13. An apparatus as set forth in claim 12 wherein said structure includes arcuate surface means for deflecting said webbing, said ball and socket joint being disposed above and adjacent to said arcuate surface means.

14. An apparatus as set forth in claim 12 further including a longitudinally extending member interconnecting said ball and socket joint with said closure means, said longitudinally extending member having a central axis which extends transverse to said opening.

15. An apparatus as set forth in claim 10 wherein said structure includes an edge portion which defines said opening, said outer side surface area comprising a first outer side surface area of said closure member that is disposed in engagement with said edge portion of said structure and that is movable relative to said edge portion of said structure.

16. An apparatus as set forth in claim 15 wherein said closure member includes a second outer side surface area which is flat and is defined by a circular edge portion, said first outer side surface area flares outward and away from said circular edge portion.

17. An apparatus as set forth in claim 10 wherein said closure member includes a second outer side surface area which is flat, said slot being at least partially defined by said second outer side surface area.

18. An apparatus as set forth in claim 10 wherein said structure includes an edge portion which defines said opening, said apparatus further including spring means for pressing said closure member against said edge portion.

19. An apparatus for restraining a vehicle occupant, said apparatus comprising:

seat belt webbing extendable about the vehicle occupant;

a movable closure member having a slot through which said webbing extends, and a ball and socket joint connected with said movable member to support said closure member for rotation about an axis extending through said closure member and for pivotal movement about a center which is spaced from said movable member.

20. An apparatus as set forth in claim 19 further including a longitudinally extending member interconnecting said ball and socket joint and said closure member.

21. An apparatus as set forth in claim 20 further including an arcuate surface means for deflecting said webbing, said ball and socket joint being disposed above and adjacent to said arcuate surface means.

22. An apparatus as set forth in claim 21 wherein said longitudinally extending member includes a first tubular section connected with said closure member and a second tubular section connected with said first tubular section, said first and second tubular sections being disposed in a telescopic relationship and enclosing a spring which presses said closure member against said edge portion.

23. An apparatus as set forth in claim 19 further including a structure, said structure having a circular edge portion defining an opening in which a portion of said closure member is disposed.

24. An apparatus as set forth in claim 1 having means for limiting rotational movement of said closure member about the axis extending through said closure member.

25. An apparatus as set forth in claim 1 having means for limiting pivotal movement of said closure member about the center spaced from said closure member.

26. An apparatus as set forth in claim 25 having means for limiting pivotal movement of said closure member about the axis extending through said opening.

* * * * *